United States Patent Office 3,502,153
Patented Mar. 24, 1970

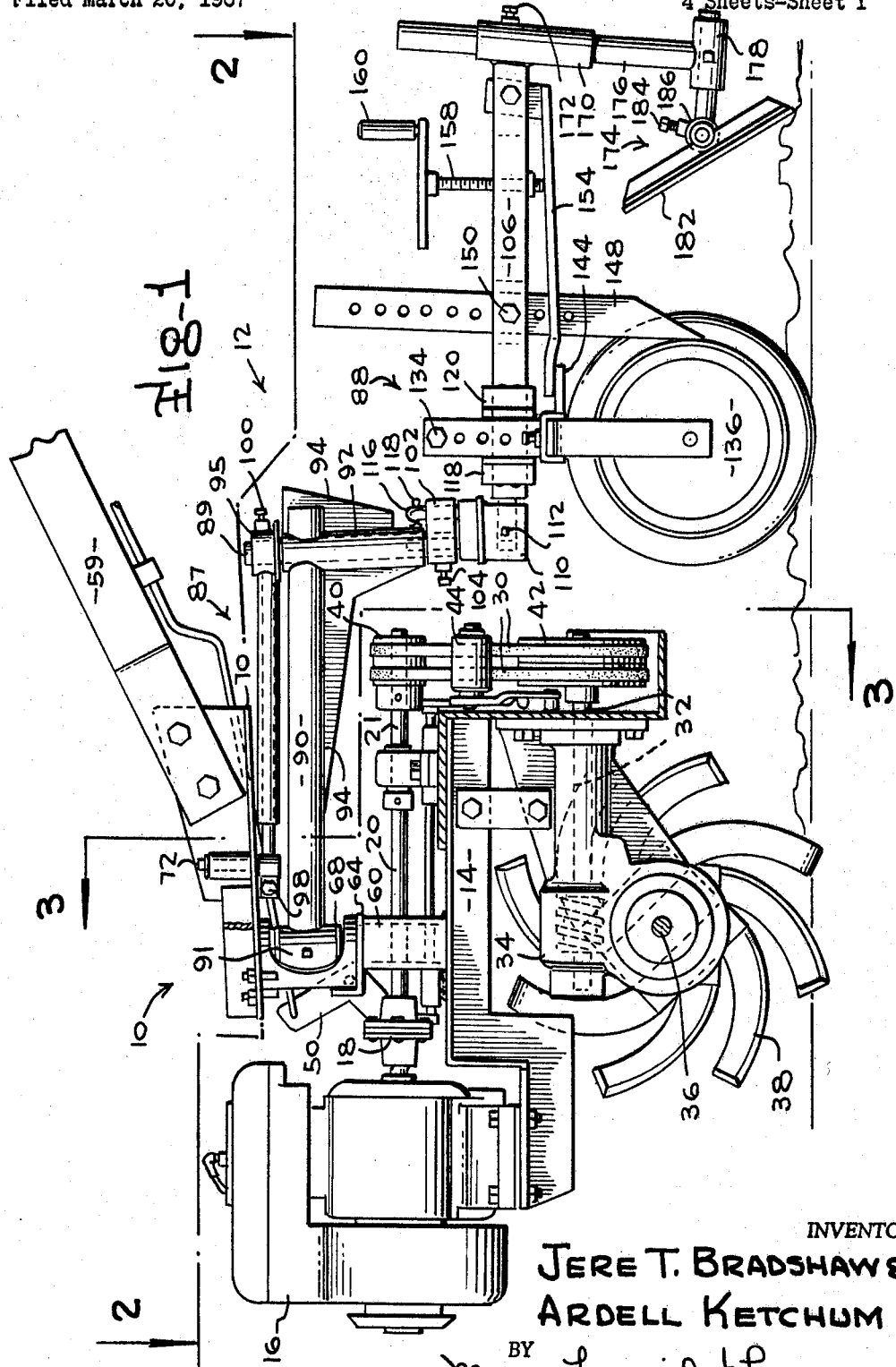

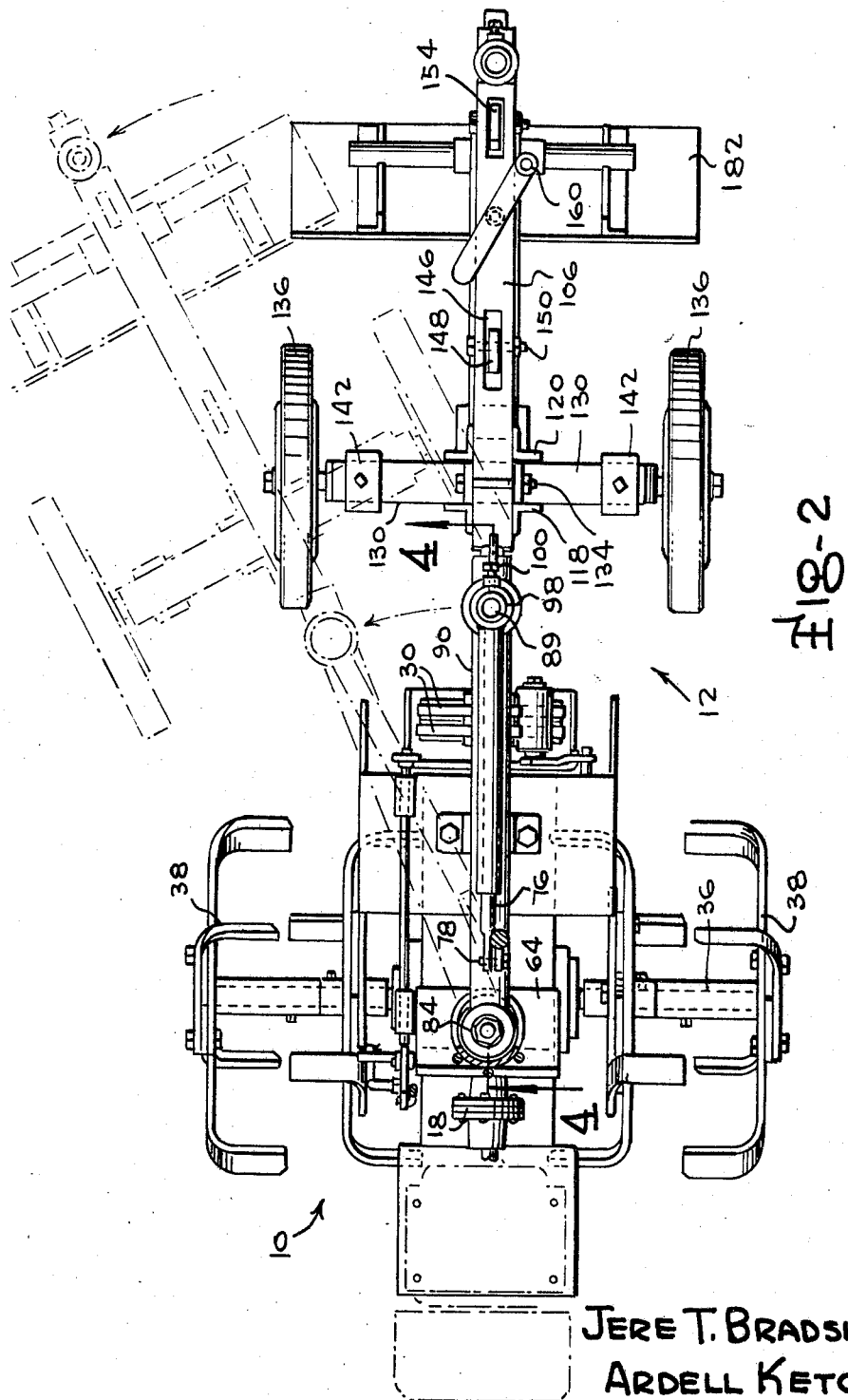

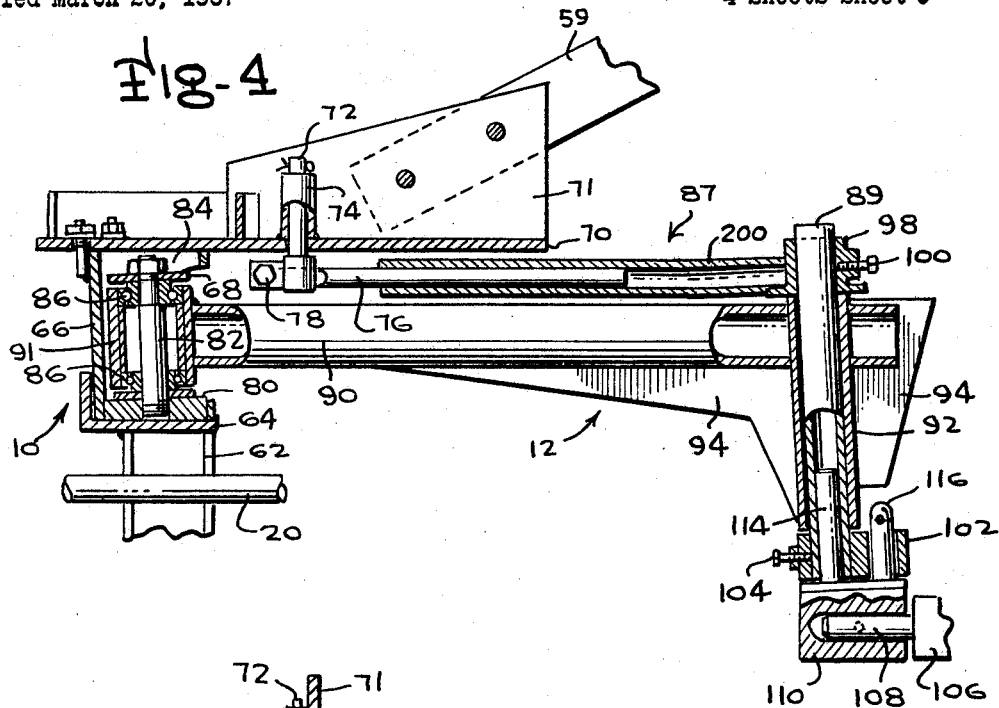
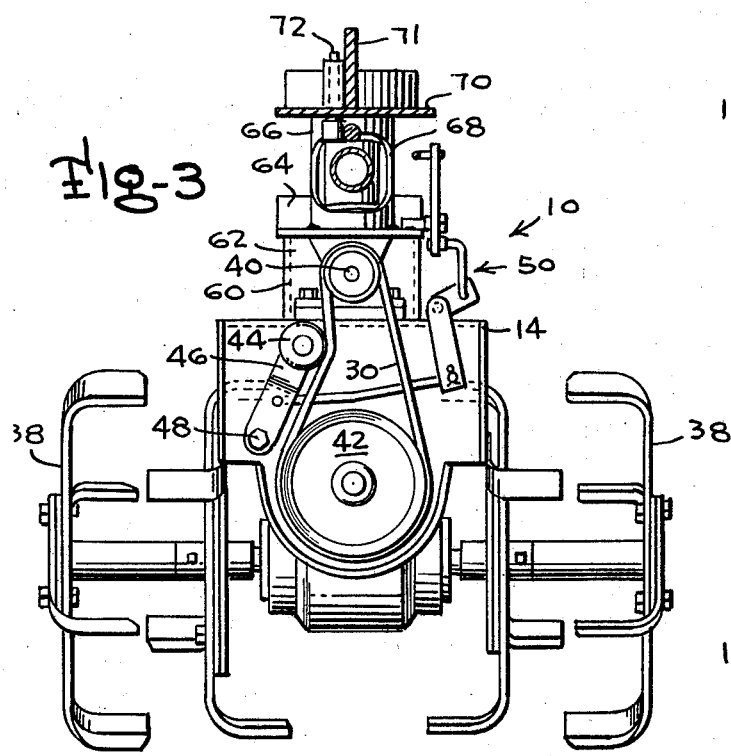
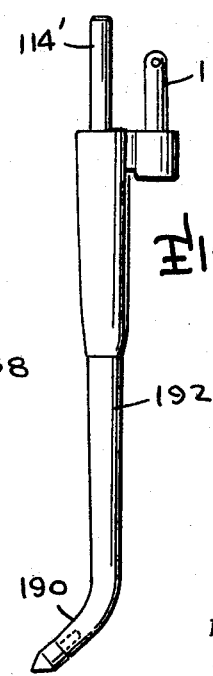

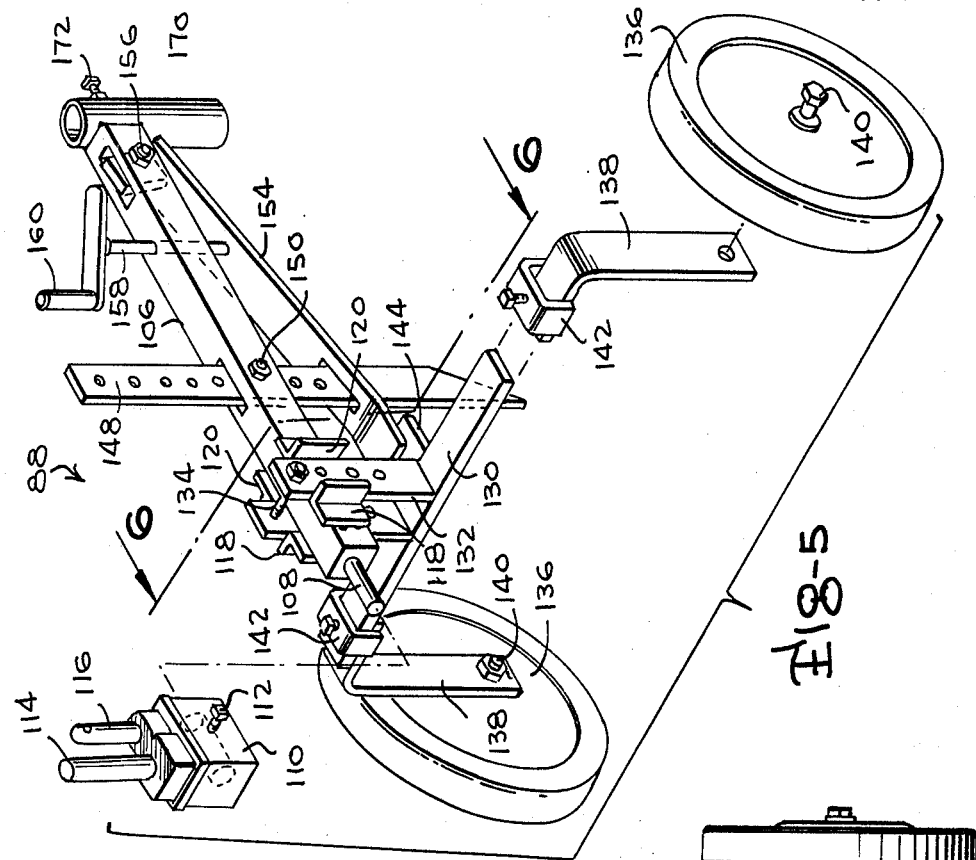

3,502,153
SOIL TILLING APPARATUS
Jere T. Bradshaw, 1803 Glen Oaks Lane, and Ardell Ketchum, Rte. 3, both of Dyersburg, Tenn. 38024
Filed Mar. 20, 1967, Ser. No. 624,525
Int. Cl. A01b 3/58, 33/02, 63/26
U.S. Cl. 172—71                 7 Claims

ABSTRACT OF THE DISCLOSURE

A rotary tiller having articulated trailing means mounting agricultural tools for soil engagement which is towed by the tiller. The trailing means is connected to the tiller chassis by a linkage which exerts a compensating force against the tiller chassis and the trailing means when the tiller chassis and the trailing means are not in alignment which tends to realign the elements so that the entire structure is very easily controlled by the operator. Another aspect is the provision of tool support means which is vertically adjustable during the tiller operation without stopping the tiller.

BACKGROUND OF THE INVENTION

This invention relates to agricultural equipment and more particularly to small garden tractors or cultivators of the type employing driven rotary tillers for cultivating the soil and for also providing a forward movement of the entire cultivator assembly.

Manually operated cultivators currently known to the art have proven to be generally satisfactory in most respects. However, the known devices have all exhibited the undesirable characteristics of being unwieldly and difficult to control. In fact, a great deal of strength is required of the operator of such in order to properly steer the devices if they are to be effectively driven across desired soil areas. This is true because many of the known devices are difficult to turn, and moreover, when moving in a curved path, require a manhandling operation including lifting and pulling. Consequently, the prior art devices have been quite tiring to operate for any extended period of time and have been practically impossible to operate by those persons not having a large amount of physical strength.

Many of the prior art cultivators employ a digging or soil breaking tool engaging the soil to slow down the movement of the cultivator so that the rotating tillers remain in a given position an adequate period of time to thoroughly pulverize the soil. Obviously, it is desirable that the soil engaging tool be adequately adjustable to adjust the depth of soil penetration in accordance with the nature of the soil being cultivated. The known devices for accomplishing such an adjustment have required that the cultivator be stopped and the tool and its support reassembled in a different position. Obviously this is an inefficient time wasting procedure.

SUMMARY OF THE INVENTION

Therefore, it is a primary object of this invention to provide a new and improved cultivator assembly.

It is a further object of this invention to provide a new and improved cultivator assembly which is easily steered and tends to follow a straight line path of movement.

Yet another object of this invention is the provision of a new and improved cultivator assembly employing rotatable tillers and a trailing tool support which are connected to provide steering compensation forces which tend to cause the overall structure to follow a straight path of travel.

The aforementioned objects are accomplished through the provision of an articulated trailing means having an earth engaging tool vertically adjustable thereon and which is connected to a cultivator chassis assembly employing rotating soil tillers. The cultivator assembly provides the force necessary to move the entire structure in a forward direction and the trailing assembly is pivotably connected to the cultivator assembly by a steering compensation force providing linkage system which, subsequent to turning movement of the cultivator assembly with respect to the trailing means, provides a realigning force for realigning the elements to enable return to a straight line path of travel. The realigning force makes it extremely easy to guide the assembly.

BRIEF DESCRIPTION OF THE DRAWINGS

Other objects and many of the advantages of this invention will be readily appreciated as the same becomes better understood by reference to the following detailed description when considered in connection with the accompanying drawings in which like reference numerals designate like parts throughout the figures thereof and wherein:

FIGURE 1 is a side elevation view of a preferred embodiment of the invention;

FIGURE 2 is a sectional view taken along lines 2—2 of FIGURE 1;

FIGURE 3 is a sectional view taken along lines 3—3 of FIGURE 1;

FIGURE 4 is a section view taken along lines 4—4 of FIGURE 2;

FIGURE 5 is an exploded perspective view of the tool mounting trailing means employed in the preferred embodiment of the invention;

FIGURE 6 is a sectional view taken along lines 6—6 of FIGURE 5;

FIGURE 7 is an exploded perspective view of a scraper attachment employed with the structure illustrated in FIGURES 5 and 6; and FIGURE 8 is a side elevational view of an earth working tool employed in the preferred embodiment of the invention.

The preferred embodiment of the invention comprises two primary elements, a power driven tiller chassis generally designated 10 and a trailing articulated tool mounting means generally designated 12 in FIGURE 1.

The tiller chassis includes a main frame 14 which has an internal combustion engine 16 attached to one end thereof as shown in FIGURE 1. The output of the internal combustion engine 16 is connected through a flexible drive coupling 18, shafts 20 and 21, belts 30, shaft 32 and the bearing 34 to rotate tiller drive shaft 36 and tiller member 38 in a counter-clockwise direction as viewed in FIGURE 1. Belts 30 are mounted on first and second pulleys 40 and 42 respectively attached to shafts 21 and 32 and are engaged by a snubbing roller 44 which tensions the belts to provide a non-slipping drive from motor 16 to tiller member 38. The snubber roller 44 is moved into and out of engagement with belts 30 by means of a manually operated linkage system generally designated 50 (FIG. 3) which is connected to a control handle (not shown) mounted on the upper end of a steering handle 59.

First and second brackets 60 and 62 extend upwardly from frame 14 as shown in FIGURES 1 and 3 and are bridged by an angle plate 64 which is also illustrated in FIGURE 2. A circular frame member 66 extends upwardly from angle plate 64 and has a large rearward facing opening 68 as shown in FIGURES 3 and 4. Opening 68 is also illustrated in FIGURE 1. A horizontal frame member 70 is attached to the top of circular frame member 66. A steering handle 59 is connected to a vertical plate portion 71 of frame 70 as shown in FIGURE 4 and a stud 72 is received within a cylindrical bearing 74 extending upward from frame member 70. The lower end of stud 72 is connected to a rod 76 by bolt 78. The purpose of rod 76 will be discussed later.

FIGURE 4 provides the best illustration of the means by which the articulated tool mounting means 12 is connected to the tiller chassis 10. A bed plate 80 is attached to the top of angle p'ate 64 within the interior of circular frame member 66. Bed plate 80 receives a threaded pivot stud 82 oriented with an approximately 5 degree negative caster so that the axis of pin 82 is oriented in a vertical plane passing through the longitudinal axis of the device with the pin being oriented at an angle of 85° with respect to the horizontal with the upper end of pin 82 being located forwardly of the lower end of the pin. A bolt and washer assembly 84 retains a bearing means 86 adjacent each end of stud 82. The trailing tool mounting means comprises a front frame portion 87 and a rear frame portion 88 (FIG. 1) connected by an articulation shaft 89. The bearing means 86 provides a low friction pivotable connection to the front frame portion 87. The front frame portion 87 includes a circular tow bar 90 which has a cylindrical sleeve 91 connected to its forward end to engage bearings 86. An angled sleeve 92 extends downwardly from the other end of tow bar 90 as shown in FIGURE 4 and is strengthened by web bracing 94. Articulation shaft 89 is mounted for rotation within sleeve 92 and is retained in sleeve 92 at its upper end by a retaining clamp 98 having an adjustment bolt 100 engaging shaft 89. A lower connector block 102 is clamped on the lower end of shaft 89 by a bolt 104.

Rear frame portion 88 includes a horizontal tool attachment bar 106 having a cylindrical extension 108 (FIG. 4) extending into an opening in a male connector block 110. The cylindrical extension 108 is clamped in position by an adjusting bolt 112 (FIG. 1). The male connector block 110 has a forward lug 114 and a rearward lug 116 extending from its upper surface as shown in FIGURE 5. Rearward lug 116 has an aperture at its outer extremity for receiving a cotter key 118. The forward lug 114 is received in the lower end of shaft 89 and the rearward lug 116 is received in an aperture in connector block 102 as shown in FIGURES 1 and 4. Cotter key 118 keeps block 110 from falling from block 102 in an obvious manner.

First and second angle members 118 and 120 are welded to each side of bar 106 to form vertical guides for a wheel assembly as shown in FIGURE 5. The wheel assembly comprises a central vertically movable frame consisting of a horizontal plate 130 having a pair of vertical extension plates 132 extending from its top surface between guides 118 and 122 to embrace the bar as shown in FIGURE 5. A retaining bolt 134 extends between plates 132 to limit the vertical downward movement of the wheel assembly in an obvious manner. A pair of wheels 136 are each mounted for rotation on an L-shaped angle member 138 by stub axle means 140. Each L-shaped angle member 138 is adjustably clamped to horizontal plate 130 by a clamp 142. An abutment plate 144 extends rearwardly from horizontal plate 130.

A central opening 146 in bar 106 receives an agricultural tool 148 held in vertically adjustable position by a bolt 150. A pivotable bar 154 is pivotally attached to bar 106 by bolt 156 (FIG. 5). The end of bar 154 opposite the pivot rests upon the top surfaces of abutment plate 144. A manually operable screw 158 having a handle 160 is threaded in bar 106 and has its lower end engaging the upper surface of pivotable bar 154. The vertical position of screw 158 obviously determines the extent of pivotable movement possible for bar 154 and consequently determines the extent of upward movement possible for the wheel assembly. Adjustment of screw 158 consequently adjusts the position of the wheel assembly with respect to the tool 148 so that the vertical position of the tool 148 with respect to the soil being cultivated is likewise adjusted. This adjustment determines the depth of soil penetration of tool 148. Tool 148 provides a dragging force on the tiller chassis to control the speed of movement of the overall structure so that the tiller 38 remains engaged with the soil for a sufficient period of time in one location to thoroughly pulverize the soil. The forward speed of the cultivator device differs with different types of soil and it is desirable to vary the depth of soil penetration of tool 148 to provide the required forward speed. This variation of the tool penetration depth can be accomplished while the cultivator is moving forward by the simple expedient of rotating handle 160. There is no necessity that the cultivator be stopped and adjusted as is required by the prior art devices.

A circular sleeve 170 having a block bolt 172 threaded therein is fixed to the extreme rear end of bar 106 as shown in FIGURE 5. A variety of tools may be supported within sleeve 170 and FIGURE 1 illustrates a scraper attachment generally designated 174 supported by the sleeve.

Scraper attachment 174 (FIG. 7) comprises a generally vertical rod 176 having a horizontal sleeve 178 at its lower extremity and including a clamping bolt 180 extending through sleeve 170. A scraper blade 182 is angularly adjustable about a horizontal axis and is retained in position by a bolt 184 threaded in a sleeve 186. A horizontal rod 188 is adjustably received in sleeve 178 as shown in FIGURE 1. The entire scraper blade structure is retained in vertical adjusted position by bolt 172 in an obvious manner.

For certain soil conditions and agricultural purposes, scraper 174 and tool 148 are not needed. FIGURE 8 illustrates a simple and efficient earth engaging tool which can be employed when such conditions exist. The earth engaging tool includes a lower curved portion 190 extending a forward direction, a substantially vertical portion 192 and an upper portion having forward and rearward legs 114' and 116' respectively which are received in connector block 102 in the same manner as are pins 114 and 116 discussed previously.

Retaining clamp 98 (FIG. 4) has a horizontal sleeve 200 extending outwardly in a forward direction and having rod 76 slidably received within the confines thereof as shown. When a turning movement occurs, the trailing structure 12 pivots about pivot stub 82 to the dotted line position illustrated in FIGURE 2. When the dotted line position illustrated in FIGURE 2 is assumed, the trailing members 102, 106 etc. apply a torque to the articulation shaft 89 which likewise applies torque to sleeve 200. Since sleeve 200 is engaged with rod 76, and rod 76 is fixed to pin 72 of the tiller chassis, a resilient force is exerted between the pivot chassis and the trailing structure 12, in combination with a light force on steering handle 59, causes the elements 10 and 12 to become aligned with only slight effort on the part of the person operating the device.

While only a preferred embodiment of the invention has been described, it should be understood that various changes and modifications may be made in the details thereof.

The invention desired to be protected by Letters Patent is:

1. A cultivator comprising a power driven rotatable tiller chassis;
   trailing means connected by a first pivot connection to said chassis to be towed by said chassis;
   said trailing means comprising front and rear articulated frame portion connected by an articulation shaft for relative pivotal movement with respect to each other;
   counter steering linkage mechanism means connected to said chassis and said trailing means for providing a mutually reactive steering correction force between said tiller chassis and said trailing means in response to relative turning movement of said chassis and said trailing means so that said chassis and said trailing means tend to follow a substantially linear course of movement.

2. The cultivator of claim 1 wherein said first pivot connection has a negative caster.

3. The cultivator of claim 2 wherein said trailing means includes a tool for engaging the soil being cultivated to create a drag force on said trailing means.

4. The cultivator of claim 1 wherein said counter steering mechanism includes,
a first elongated connecting element pivotally connected to said chassis at a point spaced from said first pivot connection;
a second elongated connecting member connected at one end to said first elongated member for relative axial movement between said elongated members and fixedly connected at its opposite end to said articulation shaft for pivotable movement with said articulation shaft and
wherein said articulation shaft is mounted for pivotable movement on a rearward portion of said front frame portion and is fixedly connected to a forward portion of said rear frame portion.

5. The cultivator of claim 4 wheerin said rear frame portion includes an elongated generally horizontal attachment bar;
an earth engaging tool on said attachment bar;
an adjustable wheel assembly mounted in guides on said attachment bar for vertical movement;
means on said attachment bar for receiving said tool in adjusted vertical positions;
pivotable bar means pivotably connected to said attachment bar on one end and engaging said wheel assembly on the other end; and
manually actuated vertically adjustable means connected to said attachment bar and engaging said pivotable bar to adjust the position of said bar and the vertical position of said wheel assembly to consequently adjust the soil penetration depth of said tool.

6. A cultivator comprising;
a power driven rotatable tiller chassis including power means for driving tiller means so that said tiller chassis moves in a forward direction;
articulated trailing means comprising front and rear frame portions connected for pivotal movement about articulation axis and including a pivotal connection connecting said front frame portions to said tiller chassis; and
counter steering mechanism means connected between said articulation axis and said pivot axis on said tiller chassis for providing a mutually reactive counter steering force between said tiller chassis and said trailing means when said tiller chassis and said trailing means are rotated with respect to each other so that said chassis and said trailing means tend to follow a substantially straight line path of movement.

7. The device of claim 6 wherein said counter steering mechanism means includes a first elongated connecting element pivotally connected to said chassis at a point spaced from said connection of said forward frame portion to said chassis and a second elongated connecting member connected at one end to said first elongated connecting member for relative axial movement with respect to said first elongated connecting member and fixedly connected at an opposite end to said articulation axis.

References Cited

UNITED STATES PATENTS

| | | | |
|---|---|---|---|
| 2,159,448 | 5/1939 | Olson | 172—256 |
| 2,647,761 | 8/1953 | Kentz | 280—446 |
| 2,827,842 | 3/1958 | Peterson et al. | 172—71 X |
| 3,158,205 | 11/1964 | Frager et al. | 172—285 |

ROBERT E. PULFREY, Primary Examiner

STEPHEN C. PELLEGRINO, Assistant Examiner

U.S. Cl. X.R.

172—43, 427, 256; 280—446